(12) United States Patent
Migita (10) Patent No.: US 6,526,106 B1
(45) Date of Patent: Feb. 25, 2003

(54) SYNCHRONOUS CIRCUIT CONTROLLER FOR CONTROLLING DATA TRANSMISSION BETWEEN ASYNCHROUS CIRCUIT

(75) Inventor: Takahisa Migita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/073,399

(22) Filed: May 7, 1998

(30) Foreign Application Priority Data

May 8, 1997 (JP) ............................................. 9-118017

(51) Int. Cl.$^7$ ................................................ H04L 7/00
(52) U.S. Cl. ........................ 375/354; 327/153; 327/161
(58) Field of Search ............................... 375/354, 373, 375/371, 372; 370/503, 507, 516; 327/141, 144, 152, 153, 161

(56) References Cited

U.S. PATENT DOCUMENTS

| | | | | |
|---|---|---|---|---|
| 3,908,084 A | * | 9/1975 | Wiley | 375/373 |
| 4,604,582 A | * | 8/1986 | Strenkowski et al. | 327/147 |
| 4,700,347 A | * | 10/1987 | Rettberg et al. | 714/700 |
| 4,720,709 A | | 1/1988 | Imamura et al. | |
| 5,022,057 A | * | 6/1991 | Nishi et al. | 375/373 |
| 5,313,501 A | * | 5/1994 | Thacker | 375/369 |
| 5,327,466 A | * | 7/1994 | Marinaro | 375/354 |
| 5,684,841 A | * | 11/1997 | Chiba et al. | 375/354 |
| 6,262,921 B1 | * | 7/2001 | Manning | 365/194 |

FOREIGN PATENT DOCUMENTS

| | | |
|---|---|---|
| EP | 0 648 033 A1 | 12/1993 |
| EP | 0 738 057 A2 | 1/1996 |
| JP | 2-250535 | 10/1990 |
| JP | 3-255743 | 11/1991 |
| JP | 6-237246 | 8/1994 |
| JP | 7-264175 | 10/1995 |
| JP | 8-330932 | 12/1996 |

OTHER PUBLICATIONS

European Search Report dated Aug. 13, 2001.

* cited by examiner

Primary Examiner—Jean Corrielus
(74) Attorney, Agent, or Firm—McGinn & Gibb, PLLC (57) ABSTRACT

A synchronous circuit controller includes a delay section for delaying data with a predetermined amount of delay, and outputting corresponding delay data, a latch section for latching each of the data in synchronization with a clock, and outputting latch data, a comparator circuit for comparing the latch data to each other in the ascending order of the amount of delay, detecting matching or non-matching between signals to be compared, and outputting comparison signals corresponding to the detection results, respectively, and a selector circuit for selecting one of the data as synchronous data in response to control of the comparison signal.

20 Claims, 8 Drawing Sheets

SYNCHRONOUS CIRCUIT CONTROLLER FOR CONTROLLING DATA TRANSMISSION BETWEEN ASYNCHROUS CIRCUIT

BACKGROUND OF THE INVENTION

1. Field of the Invention

The present invention relates to a synchronous circuit controller, and, more particularly, to a synchronous circuit controller for controlling data transmission between a plurality of synchronous circuits each of which operates at an independent clock.

2. Description of the Prior Art

Conventionally, data transmission has been extensively used between microcomputers which are synchronous circuits operating at independent clock, or between a microcomputer and another device.

In such case, all digital circuits in a synchronous circuit or a first synchronous circuit operate in synchronization with a clock of first phase of the synchronous circuit or a first clock. In addition, all digital circuits in another or a second synchronous circuit operates in synchronization with a second clock in the second phase of the synchronous circuit which differs from the first phase.

In performing synchronous serial communication for transmitting data from the first synchronous circuit to the second synchronous circuit, the first synchronous circuit outputs a first signal in synchronization with the first clock. The second synchronous circuit is necessary to normally operate when it receives the first signal.

Figure 7:
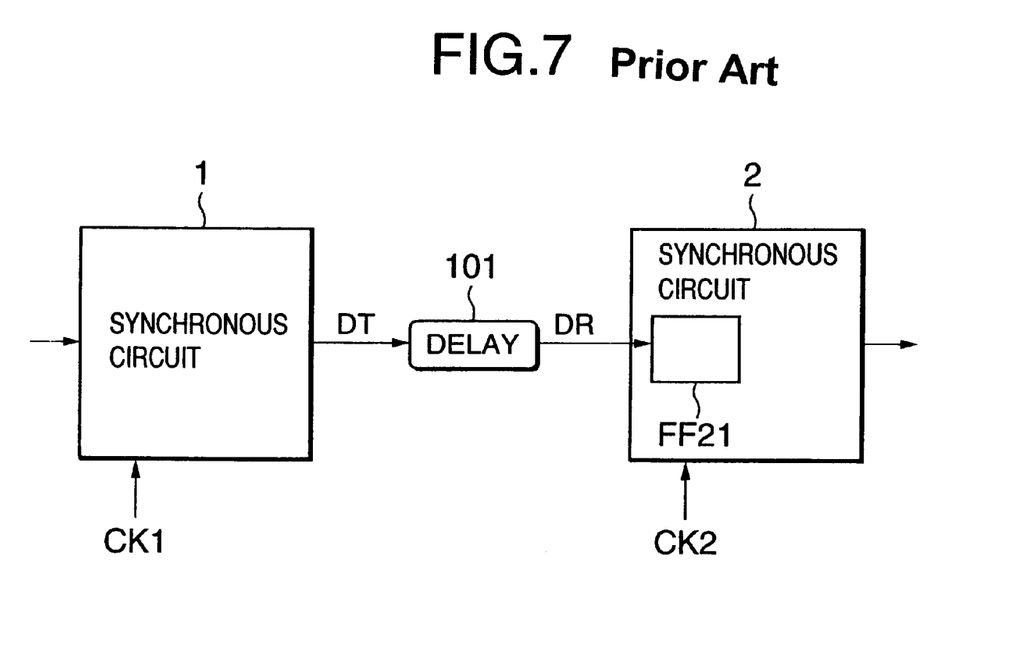
FIG. 7 is a block diagram showing an example of a first conventional synchronous circuit controller.

Referring to FIG. 7 which shows in a block diagram a communication apparatus using a first synchronous circuit controller for conventional and typical synchronous serial communication to solve the problem, which is described, for example, in Japanese Patent Application Laid-Open No. 8-330932, the communication apparatus using such conventional first synchronous controller comprises a synchronous circuit 1 such as a microcomputer for transmitting data DT in synchronization with a clock CK1, a synchronous circuit 2 such as a microcomputer for receiving data DR in synchronization with a clock CK2, and a delay circuit 101 as a synchronous circuit controller for providing determined delay time for the transmitted data DT, and generating the received data DR.

The synchronous circuit 2 comprises a latch circuit FF21 consisting of a flip-flop for latching the data DR in synchronization with the clock CK2.

Figure 8:
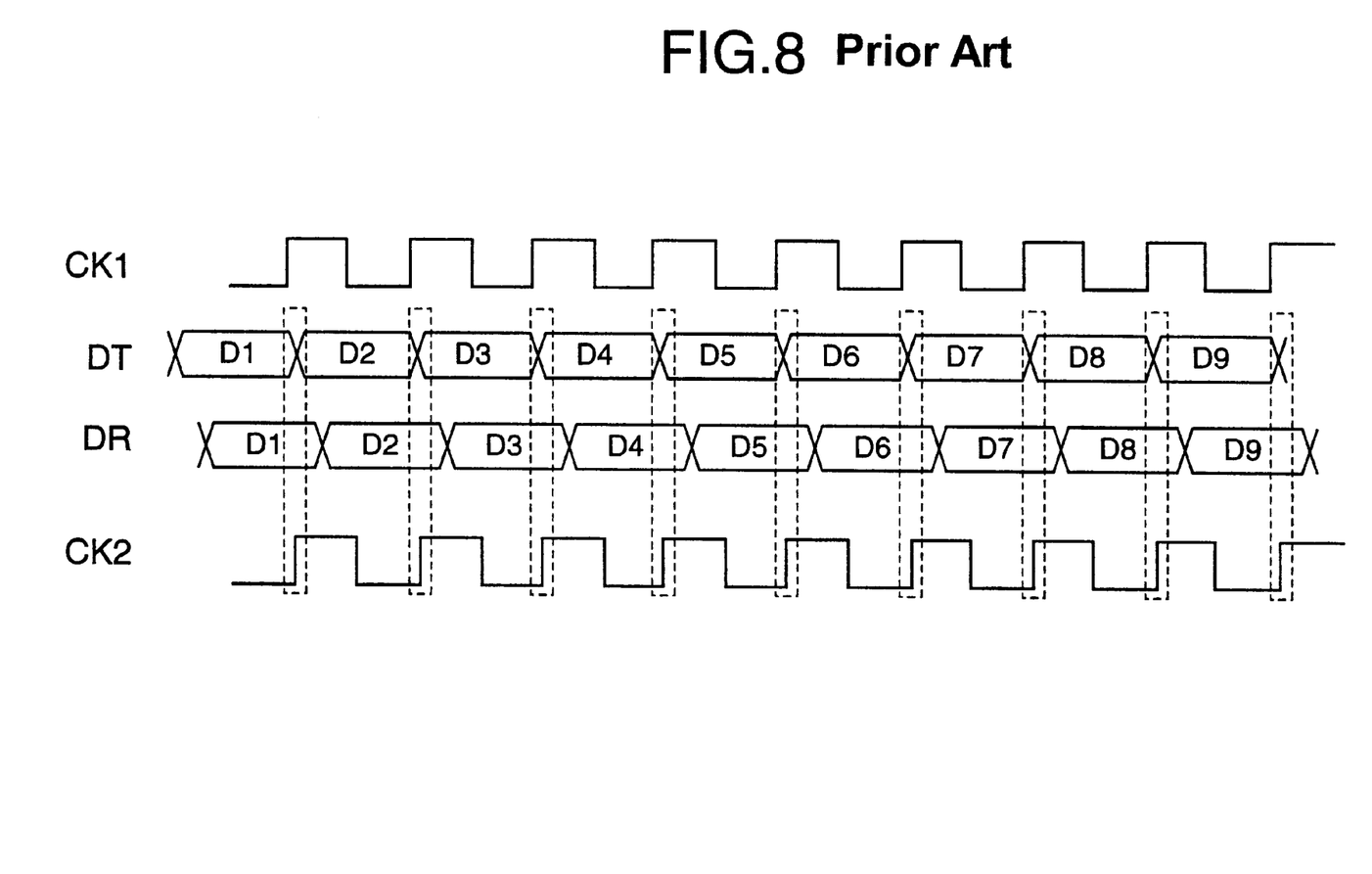
FIG. 8 is a time chart showing an example of operation in the first conventional synchronous circuit controller.

Now, the conventional synchronous circuit controller is described for its operation by referring to FIG. 7 and FIG. 8 showing the data transmission operation in a time chart. First, when the synchronous circuit 2 receives data DT transmitted from the synchronous circuit 1 as received data DR, it is necessary to receive it as normal data. In a case where the clocks CK1 and CK2 have the same frequency, and phase difference between them is previously known, desired received data DR is generated by inserting a delay circuit 101 with delay time corresponding the phase difference into the transmission line to delay the transmitted data DT by such delay time. The latch circuit FF21 of the synchronous circuit 2 latches the data DR in synchronous with the clock CK2, thereby being able to normally receive timing of the data DR without entering into a latch disable range of the latch circuit FF21, 1 or the area close to the shaded leading edge of the clock CK2.

However, there is a case where the phase difference between the clocks CK1 and CK2 is not known previously.

The first synchronous communication apparatus cannot cope with such case.

Figure 9:
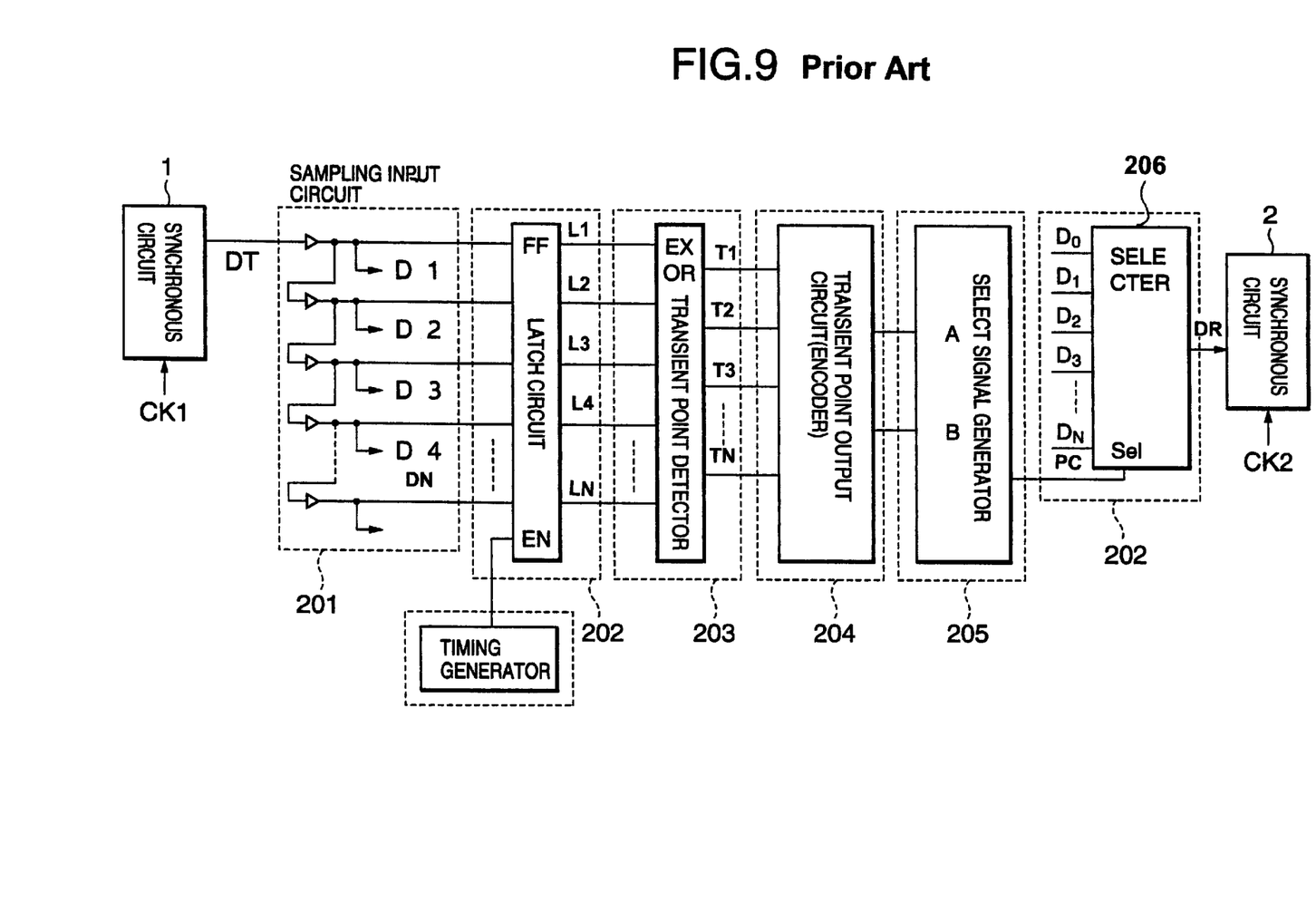
FIG. 9 is a block diagram showing an example of a second conventional synchronous circuit controller.

As measures against such circumstances, a second conventional synchronous circuit controller is described in Japanese Patent Application Laid-Open No. 7-264175. Referring to FIG. 9 showing the second conventional synchronous circuit controller in a diagram in which components common to those in FIG. 7 designated by the same references, the second conventional synchronous circuit controller comprises a sampling input circuit 201 for delaying output data DT from a synchronous circuit 1 in synchronization with a clock CK1 by a predetermined amount of delay and outputting delay data D1, D2, . . . , DN, in place of the delay circuit 101, a latch circuit 202 for latching the delay data D1, D2, . . . , DN in synchronization with a clock CK2, and outputting latch data L1, . . . , LN, a transient point detector circuit 203 consisting of an EXOR circuit etc., which EXOR circuit detects two transient points where phases of the latch data L1, . . . , LN are inverted, and outputs transient point detection signals T1, . . . , TN, a transient point output circuit 204 for sequentially encoding the transient point detection signals T1, . . . , TN in one direction from MSB, and outputting transient points A and B in this direction, a select signal generator circuit 205 for detecting a phase substantially at the center between the transient points A and B, and outputting a corresponding select signal PC, and a select circuit 206 for selecting one of the delay data D1, D2, . . . , DN as synchronous data DR in response to control by the select signal PC.

Now, the operation is described for the second conventional synchronous circuit controller with reference to FIG. 9. The sampling input circuit 201 delays the data DT supplied from the synchronous circuit 1 and in synchronization with the clock CK1 in a predetermined interval, and outputs delay data D1, D2, . . . , DN. The latch circuit 202 latches each of the delay data D1, D2, . . . , DN in synchronization with the clock CK2, and supplies the latch data L1, . . . , LN to the transient point detector circuit 203. The transient point detector circuit 203 detects two amplitude transient points or phase inverting points from 1 to 0 or 0 to 1 of latch data L1, . . . , LN, and outputs transient point detection signals T1, . . . , TN. The transient point output circuit 204 sequentially encodes the supplied transient point detection signals T1, . . . , TN in a direction from MSB to LSB, outputs transient points A and B at the MSB side, and supplies them to the select signal generator circuit 205. The select signal generator circuit 205 detects a phase substantially at the center between the transient points A and B, and supplies a corresponding select signal PC to the select circuit 206. The select circuit 206 selects one of delay data D1, D2, . . . , DN corresponding to the select signal PC, for example, D4, as synchronous data DR, and supplies it to the synchronous circuit 2.

In other words, it detects two phase inverting points representing one-bit width of data DT, detects a phase substantially at the center between these phase inverting points, and outputs delay data corresponding to the phase as synchronous data DR.

This enables it to accurately transmit and receive data even when the phase is not known previously.

BRIEF SUMMARY OF THE INVENTION

Since the first conventional synchronous circuit controller corrects the phase difference using the delay circuit which has a fixed delay time corresponding to the previously known phase difference between the first and second synchronous circuits, it has a disadvantage that it cannot be applied to a case where the phase difference is unknown.

In addition, the second conventional synchronous circuit controller which is intended to solve the above problem detects phase inverting points at respective two points of a plurality of delay data as phase correction candidates, selects a suitable pair from them as data subject to phase correction, determines the center between the data subject to phase correction as a select signal, and selects one of the plurality of delay data as the phase difference correction data with the select signal. Therefore, there is a disadvantage that the circuit is increased for its scale because of such processing.

In addition, the second conventional synchronous circuit controller has a disadvantage that it is exclusive for serial data, and cannot be applied to synchronous control for parallel data.

An object of the present invention is to provide a synchronous circuit controller which attains accurate parallel data transmission between a plurality of synchronous circuits operating in synchronization with independent clocks, and suppresses increase of the circuit scale to the minimum.

According to a first aspect of the present invention, a synchronous circuit controller transmits a first N-bit (N being an integer) parallel data signal output in synchronization with a first clock in a first phase to a second synchronous circuit latching the first signal in synchronization with a second clock in a second phase independent from the first clock by adjusting phase difference between the first and second phases, and outputting it as a second data signal in synchronization with the second clock, the controller comprising:

a delay section for delaying the first data signal by M times (M being an integer) in a step of predetermined amount of delay, and outputting corresponding first to M-th delay data;

a latch section for latching each of the first data signal and first to M-th delay data in synchronization with the second clock, and outputting a data latch signal and first to M-th delay latch signals;

a comparator circuit for comparing the data latch signal and the first to M-th delay latch signals each other in the ascending order of the amount of delay, detecting matching or non-matching between signals to be compared, and outputting first to M-th comparison signals corresponding to respective comparison results; and a selector circuit for selecting one of the data latch signal and the first to (M-1)-th delay latch signals in response to control of the first to M-th comparison signals as the second data signal.

According to a second aspect of the present invention, a synchronous circuit controller transmits a first N-bit (N being an integer) parallel data signal output in synchronization with a first clock in a first phase to a second synchronous circuit latching the first signal in synchronization with a second clock in a second phase independent from the first clock by adjusting phase difference between the first and second phases, and generating and outputting the second clock, the controller comprising:

a delay section for delaying a third clock corresponding to the second clock by M times (M being an integer) in a step of predetermined amount of delay, and outputting corresponding first to M-th delay clocks;

a latch section for latching the first data signal in synchronization with the third clock and the first to M-th delay clocks, and outputting a data latch signal and first to M-th delay latch signals;

a comparator circuit for comparing the data latch signal and the first to M-th delay latch signals each other in the ascending order of the amount of delay, detecting matching or non-matching between signals to be compared, and outputting first to M-th comparison signals corresponding to respective comparison results; and a selector circuit for selecting one of the third clock and the first to M-th delay clocks in response to control of the first to M-th comparison signals as the second clock.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Figure 1:
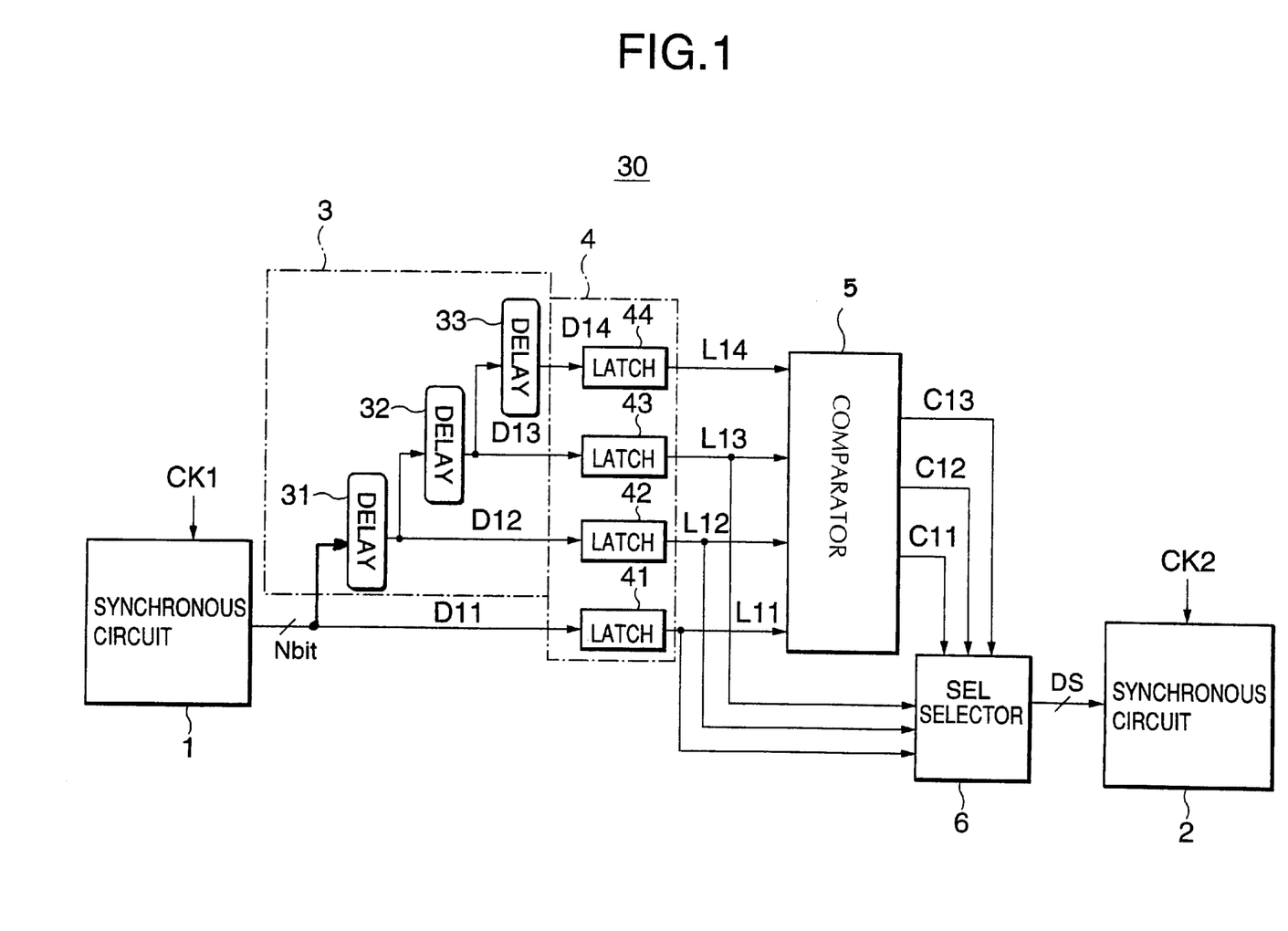
FIG. 1 is a block diagram showing a first embodiment of a synchronous circuit controller according to the present invention.

Now, referring to FIG. 1 showing a first embodiment of the present invention in a block diagram, there is shown a synchronous circuit controller 30 of the embodiment comprising a delay section 3 consisting of delay circuits 31–33 which delay output data D11 of a synchronous circuit 1 and output delay data D12–D14, respectively; a latch section 4 consisting of latch circuits 41–44 which latch each of the data D11–D14 in synchronization with a clock CK2 and output latch data L11–L14, respectively; a comparator circuit 5 for comparing the latch data L11–L14 each other in the ascending order of the amount of delay, detecting matching or non-matching between each data, and outputting comparison data C11–C13 corresponding to respective results; and a selector circuit 6 for selecting one of the latch data L11–L13 as synchronous data DS in response to control of the comparison data C11–C13, and supplying it to a synchronous circuit 2.

Figure 2:
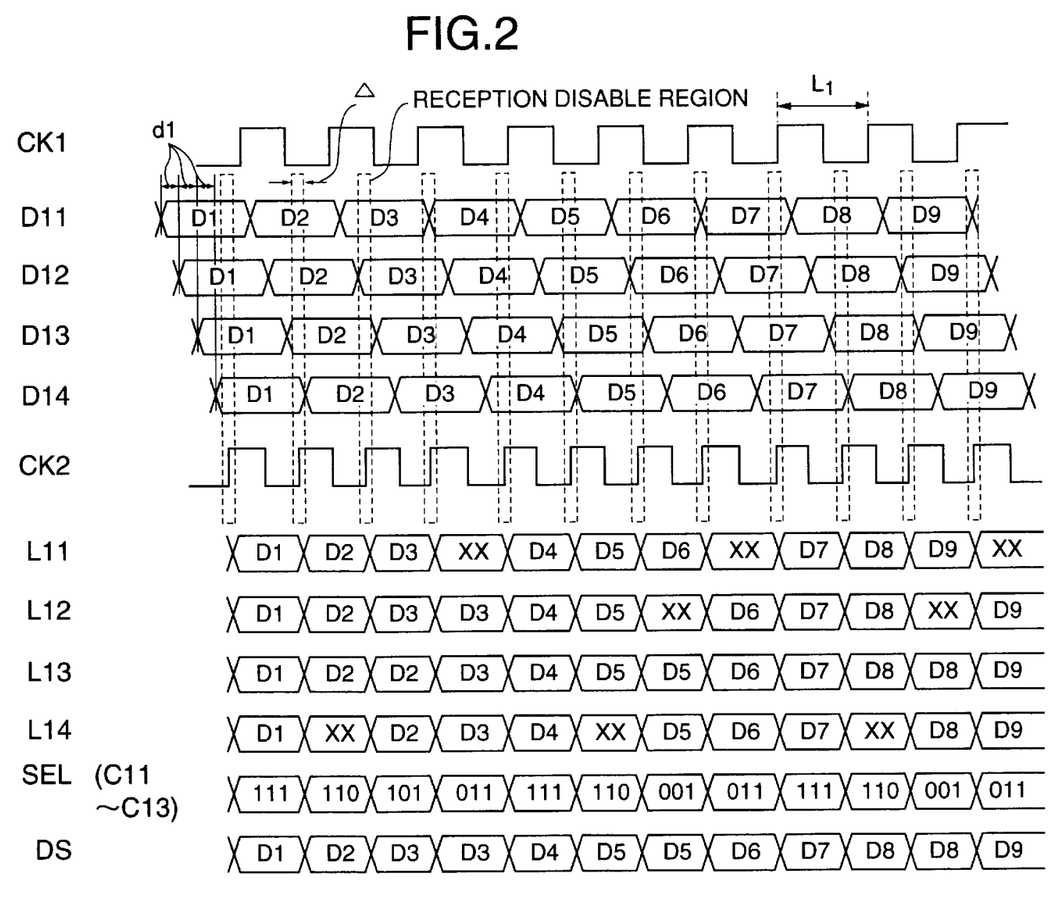
FIG. 2 is a time chart showing an example of operation in the synchronous circuit controller according to the embodiment.

Now, the operation is described for the embodiment with reference to FIG. 1 and FIG. 2 showing timing relationship of each data in a time chart. First, the synchronous circuit 1 operates at the clock CK1, outputs N-bit parallel data D11 in synchronous with the clock CK1, and supplies it to the delay circuit 31 in the delay section 3 and the latch circuit 41 in the latch section 4. Then, the delay circuit 31 outputs delay data D12 which is the input data D11 delayed by a predetermined amount of delay d1, and supplies it to the delay circuit 32 and the latch circuit 42 in the latch section 4. The delay circuit 32 delays the delay data D12 further by the amount of delay d1, outputs delay data D13, and supplies it to the delay circuit 33 and the latch circuit 43 in the latch section 4. Furthermore, the delay circuit 33 delays the delay data D13 further by the amount of delay d1, outputs delay data D14, and supplies it to the latch circuit 44 in the latch section 4. Each of the latch circuits 41–44 operates at the clock CK2, holds the delay data D11–D14, respectively, outputs corresponding latch data L11–L14, respectively, supplies them to the comparator circuit 5, and supplies the latch data L11–L13 to the selector circuit 6.

The comparator circuit 5 is constituted by an exclusive OR (EXOR) circuit, which compares the latch data L11–L14 each other in the ascending order, namely, the latch data L11 and L12, L12 and L13, and L13 and L14, to detect matching or non-matching between the data in each pair. If not, that is, in a case where the values of both data differ each other, for example, they are 1 and 0, the one with the less amount of delay, for example, L11 in the case of L11 and L12, is determined to be in a reception disabled region (shaded area) of the synchronous circuit 2 in synchronization with the clock CK2, and to be unable to receive proper data. The comparator circuit 5 outputs results of such comparison for each pair, that is, the latch data L11 and L12, L12 and L13, and L13 and L14, as comparison data C11–C13.

The selector circuit 6 is supplied with the comparison data C11–C13 as each select signal SEL, selects one of the corresponding latch data L11–L13, and outputs it as synchronous data DS. For example, if the comparison data C12 is 1, it selects the latch data L12 as the synchronous data DS.

Figure 3:
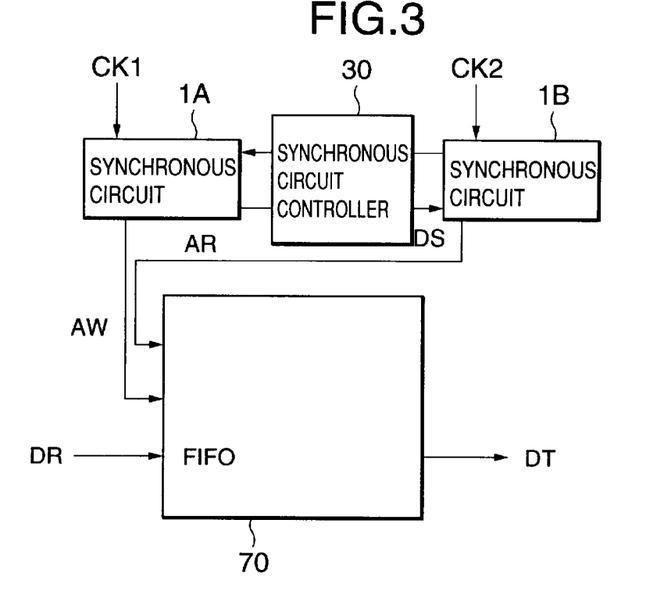
FIG. 3 is a block diagram showing a case where the synchronous circuit controller according to the embodiment is applied to a FIFO control circuit.

Then, FIG. 3 shows a specific example of the embodiment which is applied to control of a first-in/first-out (FIFO) memory in a block diagram in which like references indicate components common to FIG. 1. Referring to the figure, there is shown a FIFO controller circuit comprising a FIFO 70 to be controlled for receiving the received data DR as input in synchronization with the clock CK1, and outputting transmitted data DT in synchronization with the clock CK2; a synchronous circuit 1A which is a receiving address controller circuit operating at the clock CK1 for controlling circuit operating at the clock CK1 for controlling a receiving address and outputting a write address AW; a synchronous circuit 1B which is a transmitting address controller circuit operating at the clock CK2, consisting of a counter circuit for an output address, and outputting a read address AR; and a synchoronus circuit controller 30 of the embodiment for adjusting synchronization for data transmission/receipt between the synchronous circuits 1A and 1B for managing the addresses AW and AR.

The synchronous circuit controller 30 comprises, as described above, the delay section 3 consisting of the delay circuits 31–33 the latch section 4 consisting of the latch circuits 41–44, the comparator circuit 5, and the selector circuit 6.

Figure 4:
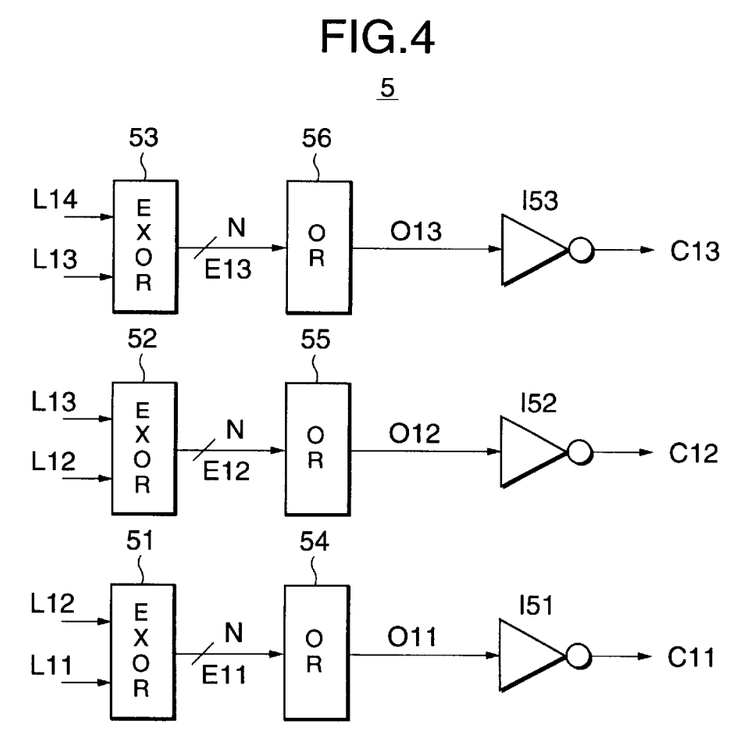
FIG. 4 is a block diagram showing an arrangement of a comparator circuit in FIG. 1.

Referring to FIG. 4 showing detail of the comparator circuit 5 in a block diagram, the comparator circuit 5 comprises an EXOR circuit 51 for EXORing the respective N-bit latch data L11 and L12, and outputting N-bit EXOR data E11; an EXOR circuit 52 for EXORing the respective N-bit latch data L12 and L13, and outputting N-bit EXOR data E12; an EXOR circuit 53 for EXORing the respective N-bit latch data L13 and L14, and outputting N-bit EXOR data E13; N-bit OR circuit 54, 55, and 56 for ORing each of EXOR data E11, E12, and E13, and outputting OR data O11, O12, and O13, respectively; and inverters I51, I52, and I53 for inverting each of the OR data O11, O12, and O13, and outputting comparison data C11, C12, and C13, respectively.

Now, referring to FIGS. 1, 2, 3 and 4, the operation is described for this circuit. First, the synchronous circuit 1 operates at the clock CK1, outputs N-bit parallel data D11 in synchronization with the clock CK1, and supplies it to the delay circuit 31 and the latch circuit 41. After performing the operation of the embodiment, the delay circuit 31 outputs delay data D12 which is the delay data D11 delayed by the amount of delay d1, the delay circuit 32 outputs delay data D13 which is the delay data D12 further delayed by the amount of delay d1, or the delay data D11 delayed by the amount of delay 2d1, the delay circuit 33 outputs delay data D14 which is the delay data D13 further delayed by the amount of delay d1, or the delay data D11 delayed by the amount of delay 3d1, and supplies to the latch circuits 41–44 in the latch section 4, respectively. Each of the latch circuits 41–44 operates at the clock CK2, temporarily holds the delay data D11–D14, respectively, output corresponding latch data L11–L14, respectively, supplies it to the comparator circuit 5, and supplies latch data L11–L13 to the selector circuit 6.

As described above, for the delay data D12–D14 which are the data D11 added with the amount of delay 0, d1, 2d1 and 3d1, respectively, depending on a phase difference between the phase of clock CK1 or data D11 and the phase of clock CK2, there is a latch disabled region or reception disabled range Δ where proper data cannot be latched and the latch data becomes indeterminate when an amplitude transient point or phase inverting point closes to the leading edge of the clock CK2.

Two or more of the latch circuits 41–44 can latch proper data at any time by setting the amount of delay d1 to the reception disabled region Δ or higher and the cycle L2 of the clock CK2 or lower.

In this example, indeterminate data in the reception disabled region Δ corresponds to XX next to each of D3, D6 and D9 for the latch data L11. Similarly, it corresponds to XX next to each of D5 and D8 for the latch data L12, and XX next to each of D1, D4 and D7 for the latch data L14. There does not exist the reception disabled region for the latch data L13.

Therefore, when the latch data L11 and L12 are compared, there arises non-matching in the data D3, D6, and D9. Similarly, the comparison result of the latch data L12 and L13 shows non-matching in data D5 and D8, the comparison result of the latch data L13 and L14 shows non-matching in the data D2, D5, and D8.

The EXOR circuit 51 of the comparator circuit 5 EXORs the latch data L11 and L12, outputs N-bit EXOR data E11, and supplies it to the OR circuit 54. If all values of each bit in the latch data L11, L12 match, the OR data O11 output from the OR circuit 54 has a value of 0, and, if they do not match, it has a value of 1. The OR data O11 is inverted by the inverter I51, and supplied to the selector circuit 6 as comparison data Cl. That is, when all bits match, 1 is output, while, when even one bit does not match, 0 is output. Similarly, the EXOR circuit 52 EXORs the latch data L12 and L13, and supplies it as comparison data C2 to the selector circuit 6 through the OR circuit 55 and the inverter I52. EXOR circuit 53 EXORs the latch data L13 and L14 and supplies it as comparison data C3 to the selector circuit 6 through the OR circuit 56 and the inverter I53.

In this example, the comparison data C11, C12, and C13 or the select signal SEL are 111, 110, 101, 011, 110, . . . for the data D1–D5, . . . As described above, since the one with less amount of delay is selected as the synchronous data DS from the latch data L11–L13, in this example, the data D1, D2, D3, D3, D4, . . . are selected and output as the synchronous data DS.

The synchronous data DS is supplied to the synchronous circuit 2A operating at the clock CK2. The latch 21A of the synchronous circuit 2A latches the synchronous data DS and generates a read address AR.

It is also possible in a similar manner to the above to design a synchronous control circuit for converting data from the synchronous circuit 2A, which is a transmission address controller circuit, to the synchronous circuit 1A, which is a reception address controller circuit. In this case, the amount of delay of data d1 is set to be less than the cycle L1 of the clock CK1, and larger than the reception disabled region of the latch circuit in synchronization with the clock CK1 corresponding to the synchronous circuit 1A.

Figure 5:
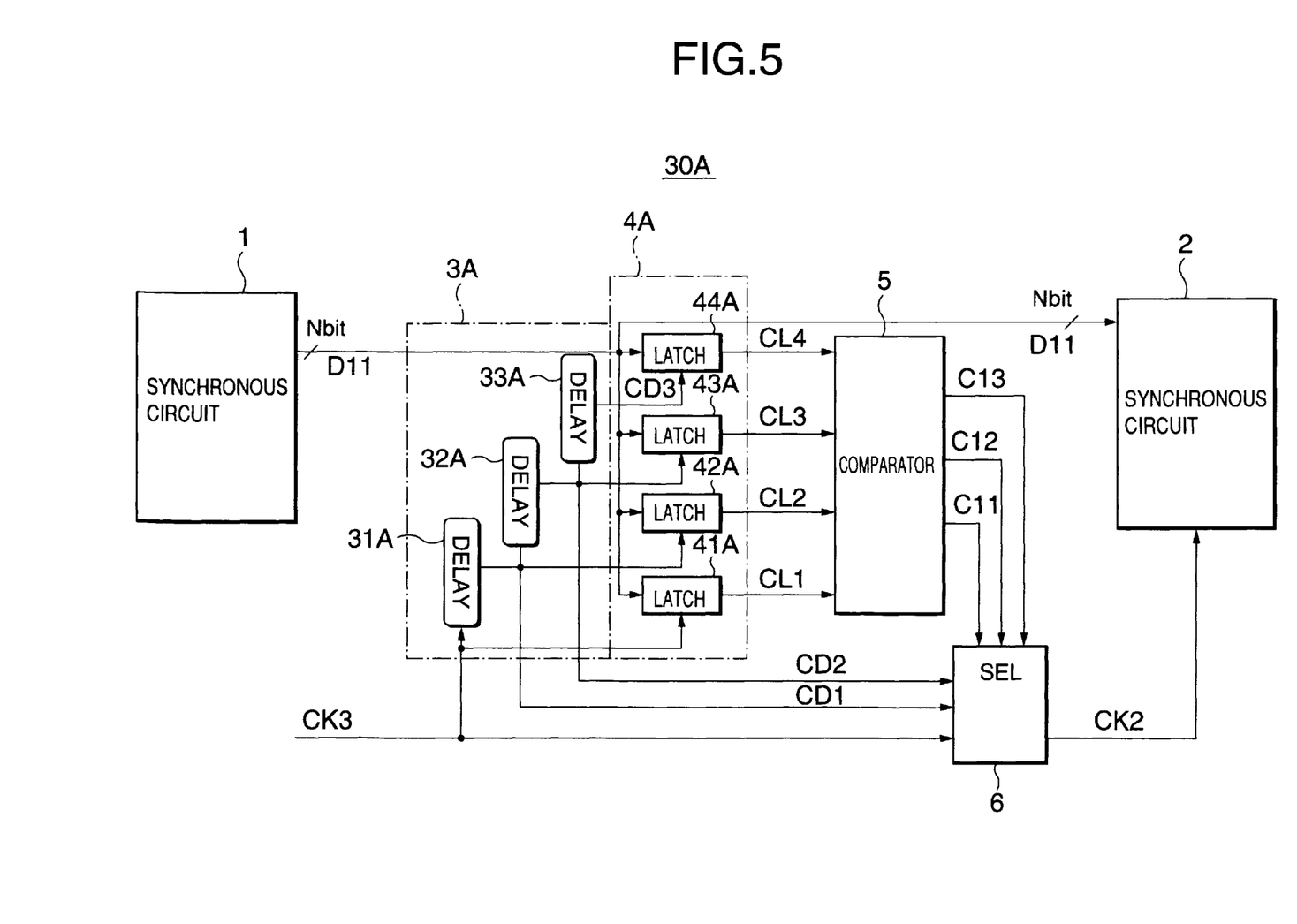
FIG. 5 is a block diagram showing a second embodiment of a synchronous circuit controller according to the present invention.

Now, FIG. 5 shows a second embodiment of the present invention in a block diagram in which components common to those in FIG. 1 designated by the same references. It is difference of the synchronous circuit controller 30A of this embodiment from the first embodiment that it comprises a delay section 3A for delaying a clock CK3, which is a reference clock of the clock CK2, instead of delaying the data D11, and outputting the delay clocks CD1–CD3; a latch section 4A for latching the data D11 in synchronization with each of the clocks CK3 and CD1–CD3, and outputting the latch data CL1–CL4; a comparator circuit 5A for comparing the latch data CL1–CL4 each other in the ascending order of the amount of delay, detecting matching or non-matching between the latch data, and outputting comparison data C11–C13; and a selector circuit 6A for selecting one of the latch clocks C11–C13 as the clock CK2 in response to control of the comparison data C11–C13, and supplying it to the synchronous circuit 2A.

Figure 6:
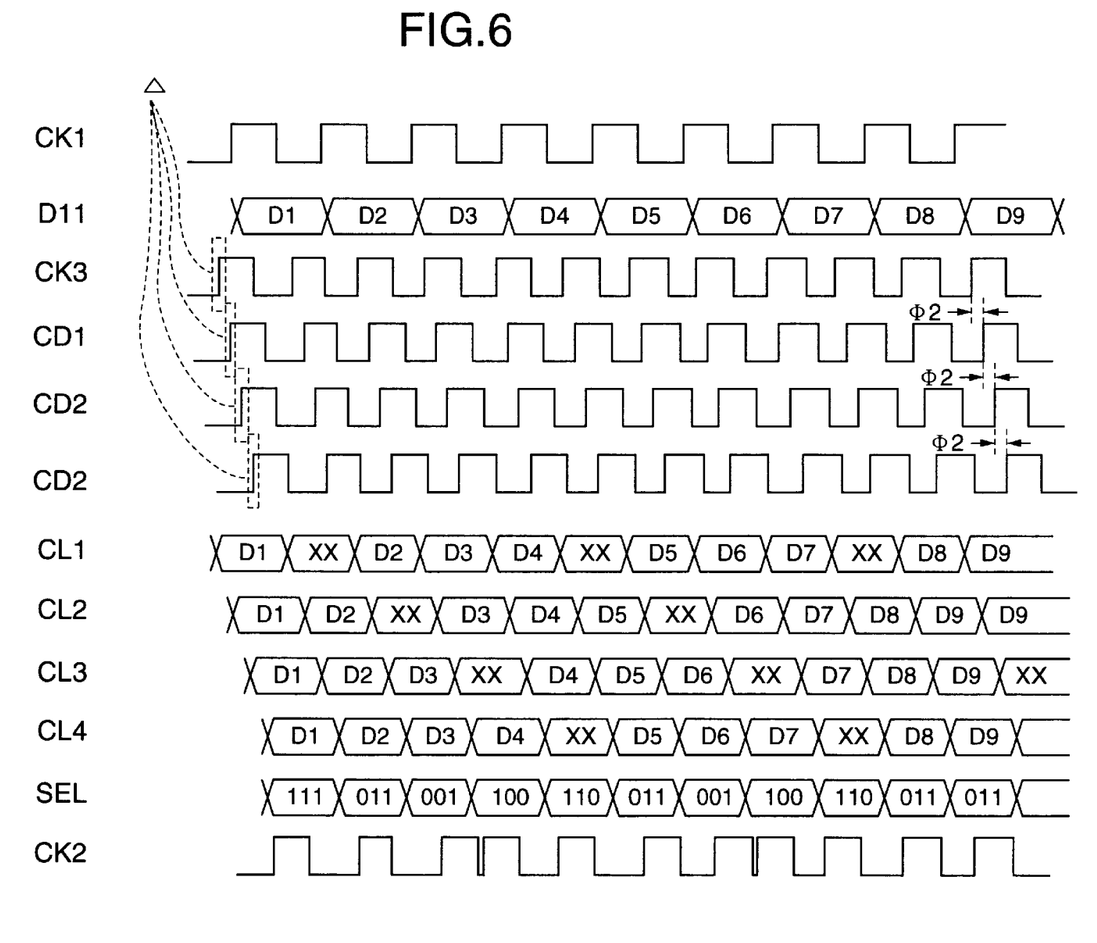
FIG. 6 is a time chart showing an example of operation in the synchronous circuit controller according to the embodiment.

Referring to FIG. 6 showing timing in each section in a time chart as well, the operation of this embodiment is omitted for its description because it is same as that of the first embodiment except for delaying the clock CK3 instead of the data, and selecting as the clock CK2 suitable latch data generated in synchronization with the delay clock.

As described above, the synchronous circuit controller of the present invention comprises a delay section, a latch section, a comparator circuit for comparing latch signals each other in the ascending order of the amount of delay, detecting matching or non-matching of them, and outputting comparison signals corresponding to the detection results, and a selector circuit for selecting one of the latch signals as a second data signal in response to the control of the comparison signal, so that there is provided an advantage that accurate parallel data transmission can be attained with a circuit with relatively small scale even when the phase difference between the synchronous circuits is unknown.

What is claimed is:

1. A synchronous circuit controller transmits a first N-bit (N being an integer) parallel data signal output in synchronization with a first clock in a first phase to a second synchronous circuit latching the first signal in synchronization with a second clock in a second phase by adjusting a phase difference between said first and second phases, and outputting a second data signal in synchronization with said second clock, said controller comprising:

a delay section for delaying said first data signal by M times (M being an integer) in a step of predetermined amount of delay, and outputting corresponding first to M-th delay data;

a latch section for latching each of said first data signal and first to M-th delay data in synchronization with said second clock, and outputting a data latch signal and first to M-th delay latch signals;

a comparator circuit for comparing said data latch signal and said first to M-th delay latch signals with each other in the ascending order of the amount of delay, detecting matching or non-matching between signals to be compared, and outputting first to M-th comparison signals corresponding to respective comparison results; and a selector circuit for selecting one of said data latch signal and said first to (M-1)-th delay latch signals in response to control of said first to M-th comparison signals as said second data signal, wherein said second clock is independent of said first clock.

2. The synchronous circuit controller as set forth in claim 1, wherein said delay section comprising N-bit first to M-th delay circuits with said amount of delay, which are connected in series.

3. The synchronous circuit controller as set forth in claim 1, wherein said comparator circuit comprises:

N-bit first to M-th exclusive logical sum circuits for performing exclusive logical sum operation on said two signals to be compared, and outputting each of first to M-th exclusive logical sum signals; and a logical sum circuit for logically summing N-bits bit strings of respective said first to M-th exclusive logical sum signals, and generating said first to M-th comparison signals.

4. The synchronous circuit controller as set forth in claim 1, wherein said amount of delay is equal to or more than the width of latch disabled region where result of latching for input data in said latch section becomes indeterminate, and equal to or less than the cycle of said second clock.

5. The synchronous circuit controller, as claimed in claim 1, wherein said first synchronous circuit comprises a receiving address controller circuit, and wherein said second synchronous circuit comprises a transmitting address controller circuit.

6. The synchronous circuit controller, as claimed in claim 5, wherein said receiving address controller circuit and said transmitting address controller circuit are connected to a memory.

7. The synchronous circuit controller, as claimed in claim 6, wherein said receiving address controller circuit controls a receiving address and outputs a write address.

8. The synchronous circuit controller, as claimed in claim 6, wherein said transmitting address controller circuit comprises a counter circuit of an output address and outputs a read address to said memory.

9. The synchronous circuit controller, as claimed in claim 1, wherein said first clock and said second clock are generated from separate clock circuits.

10. The synchronous circuit controller, as claimed in claim 1, wherein said first phase of said first clock has a value different from that of said second phase of said second clock.

11. A synchronous circuit controller transmits a first N-bit (N being and integer) parallel data signal output in synchronization with a first clock in a first phase to a second synchronous circuit latching the first signal in synchronization with a second clock in a second phase by adjusting a phase difference between said first and second phases, and outputting a second data signal in synchronization with said second clock, said controller comprising:

- a delay section for delaying a third clock corresponding to said second data signal by M times (M being an integer) in a step of predetermined amount of delay, and outputting corresponding first to M-th delay clocks;
- a latch section for latching said first data signal in synchronization with said third clock and said first to M-th delay clocks, and outputting a data latch signal and first to M-th delay latch signals;
- a comparator circuit for comparing said data latch signal and said first to M-th delay latch signals with each other in the ascending order of the amount of delay, detecting matching or non-matching between signals to be compared, and outputting first to M-th comparison signals corresponding to respective comparison results; and
- a selector circuit for selecting one of said third clock and said first to (M-1)-th clocks in response to control of said first to M-th comparison signals as said second clock,
- wherein said second clock is independent of said first clock.

12. The synchronous circuit controller, as claimed in claim 11, wherein said third clock comprises a reference clock of said second clock.

13. The synchronous circuit controller, as claimed in claim 11, wherein said first clock and said second clock are generated from separate clock circuits.

14. The synchronous circuit controller, as claimed in claim 11, wherein said first phase of said first clock has a value different from that of said second phase of said second clock.

15. A data transmission system, comprising;

a first clock;

a second clock independent of said first clock; and a synchronous circuit controller connected between said first clock and said second clock, said synchronous circuit controller comprising:

- a delay section for delaying a first data signal by M times (M being an integer) in a step of predetermined amount of delay, and outputting corresponding first to M-th delay data;
- a latch section for latching each of said first data signal and first to M-th delay data in synchronization with said second clock, and outputting a data latch signal and first to M-th delay latch signals;
- a comparator circuit for comparing said data latch signal and said first to M-th delay latch signals with each other in the ascending order of the amount of delay, detecting matching or non-matching between signals to be compared, and outputting first to M-th comparison signals corresponding to respective comparison results; and
- a selector circuit for selecting one of said data latch signal and said first to (M-1)-th delay latch signals in response to control of said first to M-th comparison signals as said second data signal.

16. The data transmission system as claimed in claim 15, wherein said synchronous circuit controller transmits a first N-bit (N being an integer) parallel data signal output in synchronization with said first clock in a first phase to a second synchronous circuit.

17. The data transmission system as claimed in claim 16, wherein said synchronous circuit latches said first signal in synchronization with a second clock in a second phase by adjusting a phase difference between said first phase and said second phase.

18. The data transmission system as claimed in claim 17, wherein said phase difference is output as a second data signal in synchronization with said second clock.

19. The data transmission system as claimed in claim 15, wherein said latch section comprises a plurality of latch circuits operating at said second clock, and wherein said latch section holds said first to M-th delay data and outputs corresponding latch data to said selector circuit.

20. The synchronous circuit controller, as claimed in claim 15, wherein said first clock and said second clock are generated from separate clock circuits.

* * * * *